United States Patent
Tzomik et al.

(10) Patent No.: US 11,841,682 B2
(45) Date of Patent: Dec. 12, 2023

(54) PRINTED SHRINK SLEEVES

(71) Applicant: Hewlett-Packard Development Company, L.P., Spring, TX (US)

(72) Inventors: Inna Tzomik, Nes Ziona (IL); Albert Teishev, Nes Ziona (IL); Katty Noorany, Nes Ziona (IL); Daniel Skvirsky, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 321 days.

(21) Appl. No.: 17/430,395

(22) PCT Filed: Jul. 25, 2019

(86) PCT No.: PCT/US2019/043361
§ 371 (c)(1),
(2) Date: Aug. 12, 2021

(87) PCT Pub. No.: WO2021/015776
PCT Pub. Date: Jan. 28, 2021

(65) Prior Publication Data
US 2022/0146956 A1   May 12, 2022

(51) Int. Cl.
G03G 9/13      (2006.01)
C09D 11/037    (2014.01)
C09D 11/106    (2014.01)
C09D 11/54     (2014.01)
G03G 9/12      (2006.01)
G03G 15/00     (2006.01)

(52) U.S. Cl.
CPC .......... *G03G 9/131* (2013.01); *C09D 11/037* (2013.01); *C09D 11/106* (2013.01); *C09D 11/54* (2013.01); *G03G 9/122* (2013.01); *G03G 15/6585* (2013.01)

(58) Field of Classification Search
CPC .... G03G 9/131; G03G 9/122; G03G 15/6585; C09D 11/037; C09D 11/106; C09D 11/54; C09D 11/03; C09D 11/107; C09D 183/06
See application file for complete search history.

(56) References Cited

U.S. PATENT DOCUMENTS 5,750,258 A    5/1998  Sakai
8,540,358 B2   9/2013  Mozel et al.
(Continued)

FOREIGN PATENT DOCUMENTS

CN   108794860      11/2018
WO   2014079482      5/2014

*Primary Examiner* — James C Yager
(74) *Attorney, Agent, or Firm* — HP Inc. Patent Department

(57) ABSTRACT

Herein is described a method of providing a printed shrink sleeve, the method comprising: providing a printed substrate comprising a liquid electrophotographically printed ink image; and coating the liquid electrophotographically printed ink image of the printed substrate with a water-based overprint varnish composition. The water-based overprint varnish composition comprising: a varnish resin; a cross-linking component comprising: a compound containing at least two epoxide groups; a compound containing an epoxide group and a silane group; or a compound containing at least two carbodiimide groups; and hydrophobic particles, the ratio of the crosslinking component to the hydrophobic particles by weight being in the range of about 4.9:0.1 to about 1:4.

15 Claims, 1 Drawing Sheet

(56) References Cited

U.S. PATENT DOCUMENTS

| | | |
|---|---|---|
| 9,714,191 B2 | 7/2017 | Zheng et al. |
| 2008/0318161 A1 | 12/2008 | Nakano et al. |
| 2011/0021098 A1 | 1/2011 | Tabellion et al. |
| 2019/0018333 A1 | 1/2019 | Tzomik et al. |

PRINTED SHRINK SLEEVES

BACKGROUND

Printed shrink sleeves are used on many types of product to display information such as corporate branding, the nature and origin of the product, and to meet regulatory requirements.

Liquid electrophotographically (LEP) printed shrink sleeves comprise an image printed using a liquid electrophotographic (LEP) printing process. Liquid electrophotographic printing processes, sometimes termed liquid electrostatic printing processes, typically involve creating an image on a photoconductive surface, applying a liquid ink having charged particles to the photoconductive surface, such that the charged particles selectively bind to the image, and then transferring the charged particles in the form of the image to a print substrate (e.g. a shrink sleeve substrate). The photoconductive surface may be on a cylinder and is often termed a photo imaging plate (PIP). The photoconductive surface is selectively charged with a latent electrostatic image having image and background areas with different potentials. For example, a liquid electrostatic ink composition including charged toner particles in a liquid carrier can be brought into contact with the selectively charged photoconductive surface. The charged toner particles adhere to the image areas of the latent image while the background areas remain clean. The image is then transferred to a print substrate directly or, by being first transferred to an intermediate transfer member, which can be a soft swelling blanket, which is often heated to fuse the solid image and evaporate the liquid carrier, and then to the print substrate.

DETAILED DESCRIPTION

Figure 1:
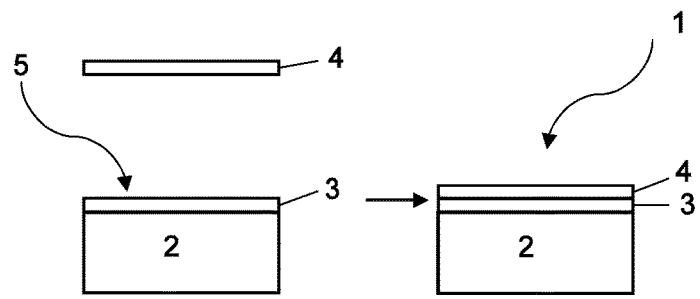
FIG. 1 is a schematic diagram of a method for providing a printed shrink sleeve.

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid", "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "liquid electrophotographic printing ink" or "LEP printing ink" generally refer to a liquid ink composition generally suitable for use in a liquid electrophotographic printing process, sometimes termed an electrostatic printing process. The LEP printing ink may include chargeable particles of a resin and a pigment dispersed in a liquid carrier, which may be as described herein.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the LEP printing ink.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the LEP printing ink.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. A LEP printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless specified otherwise, wt % values provided for components of the LEP printing ink are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided a method of providing a printed shrink sleeve. The method may comprise:
  providing a printed shrink sleeve substrate comprising a liquid electrophotographically (LEP) printed ink image;
  coating the liquid electrophotographically (LEP) printed ink image of the printed shrink sleeve substrate with a water-based overprint varnish composition, the water-based overprint varnish composition comprising:
    a varnish resin;
    a crosslinking component comprising: a compound containing at least two epoxide groups; a compound containing an epoxide group and a silane group; or a compound containing at least two carbodiimide groups; and
    hydrophobic particles,
  wherein the ratio of the crosslinking component to the hydrophobic particles by weight is in the range of about 4.9:0.1 to about 1:4.

In an aspect, there is provided a liquid electrophotographically (LEP) printed shrink sleeve. The liquid electrophotographically (LEP) printed shrink sleeve may comprise:
  a shrink sleeve substrate;
  a liquid electrophotographically (LEP) printed ink image disposed on the shrink sleeve substrate; and
  an overprint varnish composition disposed on the liquid electrophotographically (LEP) printed ink image,
  wherein the overprint varnish composition comprises the dried product of a water-based overprint varnish composition comprising:
    a varnish resin;
    a crosslinking component comprising: a compound containing at least two epoxide groups; a compound containing an epoxide group and a silane group; or a compound containing at least two carbodiimide groups; and
    hydrophobic particles,
  wherein the ratio of the crosslinking component to the hydrophobic particles by weight is in the range of about 4.9:0.1 to about 1:4.

In an aspect, there is provided a liquid electrophotographically (LEP) printed shrink sleeve. The liquid electrophotographically (LEP) printed shrink sleeve may comprise:
  a shrink sleeve substrate;
  a liquid electrophotographically (LEP) printed ink image disposed on the shrink sleeve substrate; and
  an overprint varnish composition disposed on the liquid electrophotographically (LEP) printed ink image,
  wherein the overprint varnish composition comprises the dried and cross-linked product of a water-based overprint varnish composition comprising:
    a varnish resin;
    a crosslinking component comprising: a compound containing at least two epoxide groups; a compound containing an epoxide group and a silane group; or a compound containing at least two carbodiimide groups; and
    hydrophobic particles,
  wherein the ratio of the crosslinking component to the hydrophobic particles by weight is in the range of about 4.9:0.1 to about 1:4.

In an aspect, there is provide a water-based overprint varnish composition. The water-based overprint varnish composition may comprise:
  a varnish resin;
  a crosslinking component comprising: a compound containing at least two epoxide groups; a compound containing an epoxide group and a silane group; or a compound containing at least two carbodiimide groups; and
  hydrophobic particles,
wherein the ratio of the crosslinking component to the hydrophobic particles by weight is in the range of about 4.9:0.1 to about 1:4.

The present inventors have found that shrink sleeves printed with liquid electrophotographic (LEP) images, particularly those including a primer layer to which a LEP image has been printed, are vulnerable to cracking (both during production of the printed shrink sleeves and following application to an object), wet t-shirt appearance following application to an object and undesirable sticking of the printed shrink sleeves to the object to which the printed shrink sleeve is applied. The present inventors have found that examples of the methods and products described herein avoid or at least mitigate some/all of these difficulties. The present inventors have found that the water-based varnish compositions described herein can be used to coat liquid electrophotographically (LEP) printed shrink sleeve substrates to provide improvements in the appearance of images (in terms of cracking of the image as well as wet t-shirt appearance of the image) provided on objects to which the printed shrink sleeves are applied along with providing improved performance in terms of the printed shrink sleeve sticking to the object to which it has been applied.

LEP Printed Shrink Sleeve

In some examples, a liquid electrophotographically (LEP) printed shrink sleeve is described. The LEP printed shrink sleeve may be produced by any of the methods described herein. Each component of the LEP printed shrink sleeve will be discussed in the sections that follow.

Shrink Sleeve Substrate

A shrink sleeve substrate is a material that, in an expanded state, for example in a stretched state, will contract upon the application of heat. A shrink sleeve can be put over an object, e.g. a container, in an expanded state. Heat can then be applied, such that the material of the shrink sleeve contracts around the object, e.g. container, it surrounds. In some examples, the shrink sleeve substrate may be a plastic substrate. In some examples the plastic shrink sleeve substrate may be or comprise a monoaxially stretched or biaxially stretched plastic. In some examples, the shrink sleeve substrate comprises a single layer of material, which may comprise or be plastic, or a plurality of layers of material, each of which may comprise or be plastic, and may be different to one another.

In some examples, the shrink sleeve substrate has a thickness of at least 5 µm, in some examples at least 10 µm, in some examples at least 30 µm, in some examples at least 40 µm. In some examples, the shrink sleeve substrate has a thickness of from 5 µm to 1 mm, in some examples 5 µm to 200 µm, in some examples 5 µm to 100 µm, in some examples 10 µm to 80 µm, in some examples 10 µm to 60 µm, in some examples 20 µm to 60 µm, in some examples 30 µm to 50 µm, in some examples 35 µm to 45 µm.

In some examples, the shrink sleeve substrate comprises a plastic, which may be any plastic suitable for forming a shrink sleeve. In some examples, the plastic suitable for forming a shrink sleeve may be selected from a polyalkylene, polyethylene terephthalate, polyethylene terephthalate glycol, polystyrene, polyvinyl chloride, polyethylene-2,6-napthalate, polyhexamethylene adipamide, polymers of alpha mono-olefinically unsaturated hydrocarbons having polymer producing unsaturation such as butene, vinyl acetate, methylacrylate, 2-ethyl hexyl acrylate, isoprene, butadiene acrylamide, ethylacrylate and N-methyl-n-vinyl acetamide. In some examples, the shrink sleevec substrate comprises a plastic, which may be a plastic suitable for forming a shrink sleeve, selected from polyethylene, polypropylene, polyisopropylethylene and polyisobutylethylene.

In some examples, the shrink sleeve substrate comprises a monoaxially or biaxially oriented sheet of plastic. In some examples, the substrate comprises a plastic selected from an oriented polypropylene and an oriented polyethylene. In some examples, the plastic of the plastic substrate is selected from monoaxially oriented polypropylene, biaxially oriented polypropylene, monoaxially oriented polyethylene and biaxially oriented polyethylene.

Water-Based Overprint Varnish Composition

Described herein is a water-based overprint varnish composition comprising a varnish resin; a crosslinking component comprising: a compound containing at least two epoxide groups, a compound containing an epoxide group and a silane group, or a compound containing at least two carbodiimide groups; and hydrophobic particles. In some examples, the ratio of the crosslinking component to the hydrophobic particles by weight in the water-based overprint varnish composition is in the range of about 4.9:0.1 to about 1:4.

In some examples, the water-based overprint varnish has a dynamic coefficient of friction of around 0.1-0.25. The dynamic coefficient of friction may be determined according to ASTM 1894.

Varnish Resin

Water-based overprint varnish compositions containing varnish resins in a water containing carrier are commercially available (e.g. Actdigi™ shrink sleeve aq OPV available from Actega™, and DG215™ available from Michelman™). The present inventors have found that the advantages discussed herein can be achieved by adding a crosslinking component and hydrophobic particles, as described herein, to such commercially available varnishes containing varnish resins in a water containing carrier.

The varnish resin employed in the water-based overprint varnish composition may be a varnish resin suitable for incorporation into a water containing carrier, e.g. water. The varnish resin may be any varnish resin suitable for incorporation into a shrink sleeve, for example the varnish resin may exhibit good resistance to water and high temperature; and/or the varnish resin may be a polymer exhibiting relatively high shrinkage ability on heating; and/or show good adhesion to the LEP printed image. In some examples the varnish resin is a polymeric resin, for example a polar polymeric resin. Examples of suitable varnish resins include polyurethane resins, polyacrylic resins and polyacrylates resins.

In some examples, the water-based overprint varnish comprises a varnish resin in an amount of at least about 10 wt. % by total weight of the composition, for example at least about 15 wt. %, or at least about 20 wt. %. In some examples, the water-based overprint varnish comprises a varnish resin in an amount of up to about 80 wt. % by total weight of the composition, for example up to about 75 wt. %, up to about 70 wt. %, up to about 65 wt. %, up to about 60 wt. %, or up to about 55 wt. % by total weight of the composition. In some examples, the water-based overprint varnish comprises a varnish resin in an amount of about 10 wt. % to about 80 wt. %, for example about 15 wt. % to about 70 wt. %, or about 20 wt. % to about 60 wt. % by total weight of the composition.

In addition to the varnish resin, the overprint varnish resin may include a slip agent, for example to decrease the coefficient of friction of the overprint varnish composition. In some examples, the slip agent is a non-ionic compound. In some examples, the slip agent is selected from: (a) esters, amides, alcohols and acids of oils, which may be selected from aromatic or aliphatic hydrocarbon oils, which may be selected from mineral oils, naphthenic oils and paraffinic oils; natural oils such as castor, corn, cottonseed, olive, rapeseed, soybean, sunflower, other vegetable and animal oils, and so on; and functionalized derivatives of these oils, which may be selected from, for example, polyol esters of monocarboxylic acids such as glycerol monostearate, pentaerythritol monooleate, saturated and unsaturated fatty acid amides or ethylenebis(amides), such as oleamide, erucamide, linoleamide, and mixtures thereof, glycols, polyether polyols like Carbowax, and adipic acid and sebacic acid; (b) fluoro-containing polymers such as polytetrafluoroethylene, fluorine oils, fluorine waxes and so forth; and (c) silicon compounds such as silanes and silicone polymers, including silicone oils, polydimethylsiloxane, and amino-modified polydimethylsiloxane. The water-based overprint varnish composition may comprises a slip agent in an amount of about 0.5 wt. % to about 10 wt,% by the total weight of the composition.

Crosslinking Component

The cross-linking component comprises, consists essentially of or consists of: a compound containing at least two epoxide groups; a compound containing an epoxide group and a silane group; or a compound containing at least two carbodiimide groups.

In some examples, the cross-linking component comprises a compound containing at least two epoxide groups; a compound containing an epoxide group and a silane group; or a compound containing at least two carbodiimide groups, wherein the compound containing at least two epoxide groups, the compound containing an epoxide group and a silane group; or the compound containing at least two carbodiimide groups each independently have a molecular weight, for example an average molecular weight $M_w$, of less than about 500, for example, less than about 400, or less than about 300.

The cross-linking component of the water-based overprint varnish may be a cross-linking component that is stable in water based varnish (i.e. stable in water at room temperature), i.e. stable such that the cross-linking component comprises at least two cross-linking groups after the addition of the cross-linking component to a water based system at room temperature. For example, a compound containing an epoxide group and a silane group (an epoxy-silane) may be stable in a water based system if the hydrolysed compound, i.e. a silanol, formed on addition of the epoxy-silane to water is stable in water, i.e. stable such that at least two cross-linking groups per molecule (e.g. the epoxide group and a silanol group) are available for cross-linking after addition to water In some examples, the cross-linking component comprises a compound containing an epoxide group and a silane group. The term "silane group" referred to herein may refer to an organosilane moiety containing a hydrolysable group and/or a hydrolysed group. Therefore, the compound containing an epoxide group and a silane group may be a referred to as a compound containing an epoxide group and an organosilane moiety, the organosilane moiety containing a hydrolysable group and a hydrolysed group. The "hydrolysable group" of the organosilane moiety may be a group that can be, or is, hydrolysed on contact with water to form a "hydrolysed group", e.g. a silanol. In some examples, the term "hydrolysed group" referred to herein refers to a silanol, i.e. a "hydrolysed group" (a silanol) is formed on, or following, contact of the organosilane moiety with water.

As used herein, the term "silane group" may refer to an organosilane moiety containing hydrolysable group and/or a hydrolysed group.

In some examples, the cross-linking component comprises a compound containing an epoxide group and a silane group (e.g., an organosilane moiety containing a hydrolysable group and/or a hydrolysed group). In some embodiments, the cross-linking component comprises a compound containing an epoxide group and a silane group (an organosilane moiety containing a hydrolysable group and/or a hydrolysed group) having the formula (I):

$$(XR^1\text{—})_nSi(R^2)_{4-n} \qquad (I)$$

in which X, $R^1$, $R^2$ and n are as follows.
X is glycidyloxy (i.e. glycidyl ether —O—$CH_2$CH(O)$CH_2$), epoxy, or epoxycycloalkyl. In some examples, X is glycidyloxy or epoxy. In some examples, X is glycidyloxy.

$R^1$ is a linker group linking X to Si, for example a non-hydrolysable organic linker group. In some examples, $R^1$ is a hydrocarbon linker group. In some examples and, $R^1$ is selected from a single bond, a saturated or unsaturated hydrocarbon chain which may be branched or unbranched and substituted or unsubstituted, substituted or unsubstituted arylene, or substituted or unsubstituted alkylarylene. In some examples and, $R^1$ is selected from a single bond, a saturated or unsaturated hydrocarbon chain which may be branched or unbranched, arylene, or alkylarylene. In some examples, $R^1$ is a saturated or unsaturated hydrocarbon chain which may be branched or unbranched. In some examples, $R^1$ is a saturated or unsaturated unbranched hydrocarbon chain. In some examples, $R^1$ is a saturated unbranched hydrocarbon chain. In some examples, $R^1$ is $(CH_2)_m$ and m is 0, 1, 2, or 3. In some example, $R^1$ is $(CH_2)_m$ and m is 1, 2, or 3. In some examples, $R^1$ is $(CH_2)_3$.

$R^2$ is a hydrolysable organic moiety. In some examples, each $R^2$ may be the same or different. In some examples, each $R^2$ is independently selected from $OR^3$. In some examples, $R^3$ is selected from hydrogen, substituted or unsubstituted alkyl (e.g. C2-C6 alkyl), substituted or unsubstituted carboxyl, substituted or unsubstituted alkenyl, substituted or unsubstituted alkynyl and substituted or unsubstituted aryl. In some examples, each $R^2$ is independently selected from $OR^3$. In some examples, $R^3$ is selected from hydrogen, alkyl (e.g. C2-C6 alkyl), carboxyl, alkenyl, alkynyl and aryl. In some examples, $R^2$ is selected from hydroxyl, ethoxy, isopropoxy, propoxy, tert-butyloxy, isobutoxy, butoxy, methoxyethoxy, methoxy-2-propoxy, methoxyethoxyethoxy, acetoxy, isopropenoxy, methylethylketoximino, and phenoxy. In some examples, $R^2$ may be selected from hydroxyl, ethoxy, isopropoxy, and propoxy. In some examples, $R^2$ may be selected from hydroxyl and ethoxy. In some examples, $R^2$ is ethoxy.

n is 1, 2 or 3, in some examples n is 1.

In some examples, $R^1$ and $R^2$ together form a ring moiety. In some examples, $R^1$ and $R^2$ together form a ring moiety and the organosilane is a cyclic azasiline.

In some embodiments, the cross-linking component comprises a compound containing an epoxide group and an organosilane moiety containing a hydrolysable group and/or a hydrolysed group has the formula (I):

$$(XR^1\text{—})_nSi(R^2)_{4-n} \qquad (I)$$

in which X, $R^1$, $R^2$ and n are as follows.
X is glycidyloxy or epoxy.
$R^1$ is selected from a single bond, a saturated or unsaturated hydrocarbon chain which may be branched or unbranched and substituted or unsubstituted, substituted or unsubstituted arylene, or substituted or unsubstituted alkylarylene.
$R^2$ is selected from hydroxyl. ethoxy, isopropoxy, propoxy, tert-butyloxy, isobutoxy, butoxy, methoxyethoxy, methoxy-2-propoxy, methoxyethoxyethoxy, acetoxy, isopropenoxy, methylethylketoximino, and phenoxy. In some examples, $R^2$ may be selected from hydroxyl, ethoxy, isopropoxy, and propoxy. In some examples, $R^2$ may be selected from hydroxyl and ethoxy. In some examples, $R^2$ is ethoxy.
n is 1, 2 or 3, in some examples n is 1.

In some embodiments, the cross-linking component comprises a compound containing an epoxide group and an organosilane moiety containing a hydrolysable group and/or a hydrolysed group has the formula (I):

$$(XR^1\text{—})_nSi(R^2)_{4-n} \qquad (I)$$

in which X, $R^1$, $R^2$ and n are as follows.
X is glycidoxy.
$R^1$ is $(CH_2)_m$ and m is 1, 2, or 3, for example $R^1$ is $(CH_2)_3$.
$R^2$ is from hydroxyl and ethoxy.
n is 1.

In some examples, the cross-linking component comprising an epoxide group and a silane group is glycidoxypropyl triethoxysilane.

In some examples, the cross-linking component comprises a compound containing at least two carbodiimide groups. A carbodiimide group is a —N=C=N— group. In some examples, the compound containing at least two carbodiimide groups is provided in a water solution (e.g. polycarbodiimide SV-02 from Nisshinbo™).

In some examples, the compound containing at least two carbodiimide groups has a carbodiimide equivalent weight of about 300 or greater, for example about 350 or greater, or about 400 or greater. In some examples, the compound containing at least two carbodiimide groups has a carbodiimide equivalent weight of up to about 600, for example up to about 500, up to about 440, or up to about 430. In some examples, the compound containing at least two carbodiimide groups has a carbodiimide equivalent weight in the range of about 300 to about 440, for example about 350 to about 430. The carbodiimide equivalent weight is the chemical formula weight for 1 mole of carbodiimide groups.

In some examples, the compound containing at least two carbodiimide groups has a formula (II):

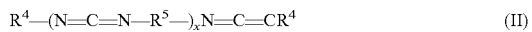  (II)

Wherein:
R$^4$ is selected from alkyl and aryl, for example C1-24 alkyl (e.g. C1-12, or C1-6 alkyl) or C3-24 aryl (e.g. C3-12, or C3-6 aryl), wherein the alkyl group may be branched or unbranched and substituted or unsubstituted and the aryl group may be substituted or unsubstituted. Examples of R$^4$ include C1-4 alkyl, e.g. butyl and C3-12 aryl groups such as phenyl.

R$^5$ is selected from alkylene and arylene, for example C1-24 alkylene (e.g. C1-12, or C1-6 alkylene) or C3-24 arylene (e.g. C3-12, or C3-6 arylene), wherein the alkylene group may be branched or unbranched and substituted or unsubstituted, and the arylene group may be substituted or unsubstituted. Examples of R$^5$ include arylene groups such as isophorone and tolyl.

X is a positive integer, for example 1-10, 1-6, 1-4, or 1-3.

In some examples, the cross-linking component comprises a compound comprising at least two epoxide groups. An example of a suitable cross-linking component comprising an epoxy group is a sorbitol diglycidyl ether (e.g ERISYS™ GE-61 available from CVC Thermoset Specialties).

In some examples, the cross-linking component comprising a compound containing at least two epoxide groups is a compound comprising 2 to 10 epoxide groups, for example, 2 to 5 epoxide groups, 2 to 4 epoxide groups, 2 to 3 epoxide groups. In some examples, the cross-linker comprises 2 epoxide groups.

In some examples, the crosslinking component is a compound containing at least two epoxide groups, the compound having the following formula (III):

  (III)

wherein, in each (Y—[Z—F]$_p$), Y, Z and F are each independently selected, such that F is an epoxy group, for example, of the formula —CH(O)CR$^6$H, wherein R$^6$ is selected from H and alkyl;
Z is alkylene,
Y is selected from (i) a single bond, —O—, —C(=O)—O—, —O—C(=O)— wherein p is 1 or (ii) Y is NH$_{2-p}$ wherein p is 1 or 2,
q is at least 1, in some example, at least 2, in some examples, 2-4,
and X is an organic group.

In some examples, the cross-linker of formula III has at least two F groups.

In some examples, F is an epoxide of the formula —CH(O)CR$^6$H in which R$^6$ is H.

X may comprise or be an organic group selected from optionally substituted alkylene, optionally substituted alkyl, optionally substituted aryl, optionally substituted arylalkyl, optionally substituted alkylaryl, isocyanurate, and a polysiloxane. X may comprise a polymeric component; in some examples, the polymeric components may be selected from a polysiloxane (such as poly(dimethyl siloxane), a polyalkylene (such as polyethylene or polypropylene), an acrylate (such as methyl acrylate) and a poly(alkylene glycol) (such as poly(ethylene glycol) and poly(propylene glycol)), and combinations thereof. In some examples, X comprises a polymeric backbone, comprising a plurality of repeating units, each of which is covalently bonded to (Y—[Z—F]$_p$), with Y, Z, F and p as described herein. X may be selected from a group selected from a branched or straight-chain C1-10 alkyl (e.g. methyl, ethyl, propyl, butyl, pentyl, hexyl), phenyl, methylene bisphenyl, triphenylmethane, cyclohexane, and isocyanurate.

In some examples, Y is selected from a single bond, —O—, —C(=O)—O—, —O—C(=O)—, p is 1, and X is an organic group selected from alkylene (e.g. C1-10 alkylene), optionally substituted alkylene (e.g. C1-10 alkylene), aryl (e.g. C5-12 aryl), optionally substituted aryl (e.g. C5-12 aryl), arylalkyl (e.g. C6-20 arylalkyl), optionally substituted arylalkyl (e.g. C6-20 arylalkyl), alkylaryl (e.g. C6-20 alkylaryl) and optionally substituted alkylaryl (e.g. C6-20 alkylaryl). In some examples, Y is selected from a single bond, —O—, —C(=O)—O—, —O—C(=O)—, p is 1, and X is an organic group selected from alkylene, aryl, arylalkyl, and alkylaryl. In some examples, Y is selected from a single bond, —O—, —C(=O)—O—, —O—C(=O)—, p is 1, and X is an organic group selected from C1-10 alkylene, C5-12 aryl, C6-20 arylalkyl, and C6-20 alkylaryl. In some examples, Y is selected from a single bond, —O—, —C(=O)—O—, —O—C(=O)—, p is 1, and X is an organic group selected from C1-10 alkylene (e.g. methylene, ethylene, propylene, butylene, pentylene, hexylene, heptylene), phenyl, methylene bisphenyl, trisphenylmethane, cyclohexane.

In some examples, X is selected from (i) an alkane, which may be an optionally substituted straight chain, branched or cyclo-alkane, (ii) a cyclo alkane having at least two substituents that are Y—[Z—F]$_p$ and (iii) an aryl (such as phenyl). In some examples, X is selected from (i) a branched alkane, with at least two of the alkyl branches covalently bonded to (Y—[Z—F]$_p$) and (ii) a cyclo alkane having at least two substituents that are Y—[Z—F]$_p$ and (iii) an aryl (such as phenyl) having at least two substituents that are Y—[Z—F]$_p$; Y is selected from (i) —O—, —C(=O)—O—, —O—C(=O)— and p is 1 or (ii) Y is —NH$_{2-p}$, wherein p is 1 or 2; Z is C1-4 alkylene; F is an epoxide of the formula —CH(O)CR$^6$H, wherein R$^6$ is selected from H and methyl, and in some examples F is an epoxide of the formula —CH(O)CR$^6$H in which R$^6$ is H.

In some examples, X is a straight chain alkane (for example, hexylene) having at least two substituents that are Y—[Z—F]$_p$ (i.e., q is at least 2); Y is —O— and p is 1; Z is C1-4 alkylene (for example, methylene); and F is an epoxide of the formula —CH(O)CR$^6$H, wherein R$^6$ is selected from H and methyl, and in some examples, R$^6$ is H.

In some examples, Z—F is a glycidyl group. In some examples, the cross-linker comprises two glycidyl groups. In some examples, the cross-linker comprises two glycidyl ether groups which are bonded to one another via a linker species and the linker species may be selected from alkyl, optionally substituted alkyl, aryl and optionally substituted aryl.

In some examples, Z—F is an epoxycycloalkyl group. In some examples, Z—F is an epoxycyclohexyl group. In some examples, Z—F is an epoxycyclohexyl group, in some examples, a 3,4-epoxycyclohexyl group. In some examples, the compound containing at least two epoxide groups comprises two epoxycycloalkyl groups, in some examples, two epoxycyclohexyl groups.

In some examples, the compound containing at least two epoxide groups comprises two epoxycycloalkyl groups, which are bonded to one another via a linker species; and the linker species may be selected from a single bond, optionally substituted alkyl, optionally substituted aryl, optionally substituted arylalkyl, optionally substituted alkylaryl, isocyanurate, a polysiloxane, —O—, —C(=O)—O—, —O—C(=O)—, and amino and combinations thereof. In some examples, the linker species may be selected from alkylene, —O—, —C(=O)—O— and —O—C(=O)—. In some examples, the linker species may be selected from —C(=O)—O— and —O—C(=O)—.

In some examples, the epoxy-based cross-linker of formula III is selected from the DECH family of epoxy-based cross-linkers (including 3,4-epoxycyclohexylmethyl 3,4-epoxy-cyclo-hexane-carboxylate and 7-oxabicyclo[4.1.0]hept-3-ylmethyl 7-oxabicyclo[4.1.0]heptane-3-carboxylate) and tris(4-hydroxyphenyl)methane triglycidyl ether. In some examples, the epoxy-based cross-linker is selected from 3,4-epoxycyclohexylmethyl 3,4-epoxy-cyclo-hexanecarboxylate and 7-oxabicyclo[4.1.0]hept-3-ylmethyl 7-oxabicyclo-[4.1.0]-heptane-3-carboxylate, in some examples, 7 oxabicyclo[4.1.0]hept-3-ylmethyl 7-oxabicyclo-[4.1.0]heptane-3-carboxylate.

In some examples, the compound containing at least two epoxide groups is a diglycidyl ether. In some examples, the compound containing at least two epoxide groups is producible by the reaction of an epihalohydrin (e.g., an epichlorohydrin) with a polyol (e.g. a diol). In some examples, the polyol is an alkylpolyol.

In some examples, the compound containing at least two epoxide groups is an alkylpolyol polyglycidyl ether, for example, an alkyldiol diglycidyl ether or an alkyltriol triglycidyl ether. In some examples, the compound containing at least two epoxide groups is selected from methanediol diglycidyl ether, ethanediol diglycidyl ether, propanediol diglycidyl ether, butanediol diglycidyl ether, pentanediol diglycidyl ether, hexanediol diglycidyl ether (for example, 1,6-hexanediol diglycidyl ether), heptanediol glycidyl ether, octanediol diglycidyl ether, neopentyl glycol diglycidyl ether, cyclohexane dimethanol diglycidyl ether (e.g., 1,4-cyclohexan dimethanol diglycidyl ether), resorcinol diglycidyl ether, trimethylol ethane triglycidyl ether, trimethylol propane triglycidyl ether, propoxylated glycol triglycidyl ether.

In some examples, the compound containing at least two epoxide groups is selected from pentaerythritol polyglycidyl ether and sorbitol polyglycidyl ether.

In some examples, the water-based overprint varnish composition comprises the cross-linking component in an amount of at least about 2 wt. % by total weight of the composition, for example at least about 3 wt. %, at least about 4 wt. %, for example at least about 5 wt. % by total weight of the composition. In some examples, the water-based overprint varnish composition comprises the cross-linking component in an amount of up to about 20 wt. % by total weight of the composition, for example up to about 15 wt. %, up to about 12 wt. % by total weight of the composition. In some examples, the water-based overprint varnish composition comprises the cross-linking component in an amount in the range of about 2 wt. % to about 20 wt. % by total weight of the composition, for example about 3 wt. % to about 20 wt. %, about 4 wt. % to about 20 wt. %, about 5 wt. % to about 20 wt. %, or about 5 wt. % to about 20 wt. % by total weight of the composition.

Hydrophobic Particles

The water-based overprint composition comprises hydrophobic particles. The hydrophobic particles may be dispersible in the cross-linking component to form a slurry, e.g. a stable dispersion. A dispersion may be considered to be stable if after mechanical stirring of the crosslinking-component and the hydrophobic particles mixed in a weight ratio of 4.9:0.1 to 1:4 (e.g. in a weight ratio of 4.5:0.5 to 3:2, or in a weight ratio of about 4:1) for 15 mins using a mechanical stirring the dispersion remains stable (i.e. without the hydrophobic particles floating to the surface or sinking) for a period of at least about 30 mins, for example at least about 1 hour, at least about 5 hours, at least about 1 day or at least about 1 week).

In some examples, the hydrophobic particles comprise, consist essentially of, or consist of particles of a hydrophobic polymer or inorganic particles coated with a hydrophobic coating (e.g. a hydrophobic polymer coating or a hydroponic gel coating).

In some examples, the hydrophobic particles may be fumed silica or soda lime coated with a hydrophobic coating (e.g. a hydrophobic polymer coating or a hydroponic gel coating), or the hydrophobic particles may be formed of a hydrophobic polymer. Examples of suitable hydrophobic polymers include fluoropolymers (e.g. fluoroethylene vinyl ether copolymers) and polydimethylsiloxane. In some examples, the hydrophobic particles are particles of a hydrophobic polymer, e.g. particles of a fluoropolymer such as fluoroethylene vinyl ether copolymers. In some examples, the hydrophobic particles inorganic particles coated with a hydrophobic coating (e.g. a hydrophobic polymer coating or a hydroponic gel coating). Examples of suitable inorganic panicles are fumed silica or soda lime, such particles may be coated with a hydrophobic gel (such as a hydrophobic silica gel) or a hydrophobic polymer (e.g. a fluoropolymer such as fluoroethylene vinyl ether copolymers).

In some examples, the hydrophobic particles are hydrophobic microparticles, for examples particles having an number average particle size of less than about 100 μm, for example about 90 μm or less, about 80 μm or less, or about 70 μm or less. In some examples, the hydrophobic particles are hydrophobic microparticles, for examples particles having an number average particle size of greater than about 5 μm, for example about 10 μm or greater, about 15 μm or greater, or about 20 μm or greater. In some examples, the hydrophobic particles are hydrophobic microparticles, for examples particles having an number average particle size in the range of about 5 μm to about 100 μm, for example about 10 μm to about 90 μm, about 15 μm to about 80 μm, or about 20 μm to about 70 μm. The number average particle size may be determined using a microscope and measuring the largest dimension of each particle within the field of view and taking the average.

In some examples, the water-based overprint varnish composition comprises the hydrophobic particles in an amount of at least about 0.1 wt. % by total weight of the composition, for example at least about 0.2 wt. %, at least about 0.3 wt. %, at least about 0.4 wt. %, for example at least about 0.5 wt. % by total weight of the composition. In some examples, the water-based overprint varnish composition comprises the hydrophobic particles in an amount of up to about 5 wt. % by total weight of the composition, for example up to about 5 wt. %, up to about 3 wt. % by total weight of the composition. In some examples, the water-based overprint varnish composition comprises the hydrophobic particles in an amount in the range of about 0.1 wt. % to about 5 wt. % by total weight of the composition, for example about 0.3 wt. % to about 4 wt. %, about 0.5 wt. % to about 3 wt. % by total weight of the composition.

Combination of Crosslinking Component and Hydrophobic Particles

In some examples, the water-based overprint varnish composition comprises a cross-linking component comprising a compound containing an epoxy group and a silane group (for example a compound according to formula (I) above), and hydrophobic particles which are particles of a hydrophobic polymer. In some examples, the hydrophobic polymer is a fluoropolymer, e.g. a fluoroethylene vinyl ether copolymer.

In some examples, the water-based overprint varnish composition comprises the water-based overprint varnish resin comprises the cross-linking component and the hydrophobic particles in an amount such that the total amount of the cross-linking component and the hydrophobic particles together in the composition is at least about 2 wt. % by total weight of the composition, for example at least about 3 wt. %, at least about 4 wt. %, for example at least about 5 wt. % by total weight of the composition. In some examples, the water-based overprint varnish composition comprises the water-based overprint varnish resin comprises the cross-linking component and the hydrophobic particles in an amount such that the total amount of the cross-linking component and the hydrophobic particles together in the composition is up to about 20 wt. % by total weight of the composition, for example up to about 15 wt. %, up to about 12 wt. % by total weight of the composition. In some examples, the total amount of the cross-linking component and the hydrophobic particles together in the composition is in the range of about 2 wt. % to about 20 wt. % by total weight of the composition, for example about 3 wt. % to about 20 wt. %, about 4 wt. % to about 20 wt. %, about 5 wt. % to about 20 wt. %, or about 5 wt. % to about 20 wt. % by total weight of the composition.

In some examples, the water-based overprint varnish composition comprises the crosslinking component and the hydrophobic particles in a ratio of the crosslinking component to the hydrophobic particles by weight in the range of about 4.9:0.1 to about 1:4, for example in the range of about 4.5:0.5 to about 3:2, or about 4:1.

In some examples, the water-based overprint varnish composition comprises:

about 2 wt. % to about 20 wt. % of a cross-linking component by total weight of the composition, the cross-linking component comprising, consisting essentially of or consisting of a compound containing at least two epoxide groups, a compound containing an epoxide group and a silane group, or a compound containing at least two carbodiimide groups; and about 0.1 wt. % to about 5 wt. % hydrophobic particles by total weight of the composition, the hydrophobic particles comprising, consisting essentially of, or consisting of particles of a hydrophobic polymer or inorganic particles coated with a hydrophobic coating;

wherein the ratio of the crosslinking component to the hydrophobic particles by weight is in the range of about 4.9:0.1 to about 1:4, optionally in the range of about 4.5:0.5 to about 3:2, or about 4:1.

In some examples, the water-based overprint varnish composition comprises:

about 2 wt. % to about 20 wt. % of a cross-linking component by total weight of the composition, the cross-linking component comprising, consisting essentially of or consisting of a compound containing an epoxide group and a silane group; and about 0.1 wt. % to about 5 wt. % hydrophobic particles by total weight of the composition, the hydrophobic particles comprising, consisting essentially of, or consisting of particles of a hydrophobic polymer;

wherein the ratio of the crosslinking component to the hydrophobic particles by weight is in the range of about 4.9:0.1 to about 1:4, optionally in the range of about 4.5:0.5 to about 3:2, or about 4:1.

Preparation of Water-Based Overprint Varnish Composition

In some examples, providing the water-based overprint varnish composition comprises preparing the water-based overprint varnish composition comprising: mixing the cross-linking component and the hydrophobic particles to form a dispersion or a slurry.

Where the cross-linking component comprises a compound containing an epoxide group and a silane group, the preparation of the water-based overprint varnish may comprise mixing a compound containing an epoxide group and an organosilane moiety containing a hydrolysable group. The hydrolysable group of the organosilane may be hydrolysed on contact with water to form a hydrolysed group (e.g. a silanol).

LEP Printed Ink Image

In some examples, the printed shrink sleeve substrate comprises a liquid electrophotographically (LEP) printed ink image. The printed shrink sleeve substrate may comprise a LEP printed ink image disposed on a shrink sleeve substrate. In some examples, the printed shrink sleeve substrate comprises a shrink sleeve substrate having a primer layer disposed thereon and a LEP printed ink image disposed on the primer layer.

In some examples, the printed shrink sleeve substrate is provided by applying (i.e., printing) a liquid electrophotographic (LEP) printing ink to the shrink sleeve substrate, for example, to a surface of the shrink sleeve substrate. Thus, a printed shrink sleeve substrate having disposed thereon an LEP printed ink image may be formed.

In some examples, the LEP printed ink may be present in an amount such that the coat weight of LEP printed ink measured over the surface of the shrink sleeve substrate is at least 0.01 g/m$^2$, in some examples, at least 0.05 g/m$^2$, in some examples, at least 0.1 g/m$^2$, in some examples, at least 0.5 g/m$^2$, in some examples, at least about 1 g/m$^2$. In some examples, the LEP printed ink may be present in an amount such that the coat weight of LEP printed ink measured over the surface of the shrink sleeve substrate is up to about 16 g/m², in some examples, up to about 10 g/m², in some examples, up to about 5 g/m², in some examples, up to about 4 g/m².

LEP Printing Ink

The LEP printing ink may be liquid electrophotographically printed onto the shrink sleeve substrate. In some examples, the LEP printing ink may be LEP printed onto the shrink sleeve substrate, thus forming the LEP printed ink image. In some examples, the LEP printing ink may be LEP printed onto a primer layer which has been applied onto the shrink sleeve substrate.

The LEP printing ink may comprise a thermoplastic resin. The LEP printing ink may comprise a cross-linkable thermoplastic resin. The LEP printed ink, or LEP printed ink image, (i.e., the LEP printing ink after it has been LEP printed) may comprise a cross-linked thermoplastic resin. In the printed shrink sleeve, the LEP printed ink may comprise a cross-linked thermoplastic resin.

The LEP printed ink disposed on a surface of the shrink sleeve substrate may have been printed using a liquid electrophotographic printing process. In some examples, the LEP printing ink may comprise a colorant (e.g. a pigment), a thermoplastic resin and a carrier liquid. The LEP printing ink may further comprise an additive such as a charge director, charge adjuvant, surfactant, viscosity modifier, emulsifier and the like.

In some examples, after printing, a LEP printing ink (i.e., the LEP printed ink or LEP printed ink image) may comprise a reduced amount of carrier liquid compared with the LEP printing ink before printing. In some examples, the LEP printed ink may be substantially free from carrier liquid. Substantially free from carrier liquid may indicate that the LEP printed ink or LEP printed ink image contains 5 wt. % or less carrier liquid, in some examples, 2 wt. % or less carrier liquid, in some examples, 1 wt. % or less carrier liquid, in some examples, 0.5 wt. % or less carrier liquid. In some examples, the LEP printed ink is free from carrier liquid.

Each of these components of an LEP printing ink will be described separately in the sub-sections which follow.

Thermoplastic Resin

The thermoplastic resin may be referred to as a polymer resin or a thermoplastic polymer. In some examples, the thermoplastic resin of the LEP printing ink comprises a carboxylic functional group, an amine functional group, a polyol functional group or a combination thereof. In some examples, the thermoplastic resin of the LEP printing ink comprises a carboxylic functional group. In some examples, the thermoplastic resin of the LEP printing ink comprises an amine functional group. In some examples, the thermoplastic resin of the LEP printing ink comprises a polyol functional group.

In some examples, the thermoplastic resin comprises or consists of a polymer having acidic side groups. In some examples, the acidic side groups may be in free acid form or may be in the form of an anion and associated with a counterion, generally a metal counterion, for example, a metal selected from the alkali metals, such as lithium, sodium and potassium, alkali earth metals, such as magnesium or calcium, and transition metals, such as zinc.

In some examples, the thermoplastic resin may be a copolymer of an alkylene monomer and a monomer selected from acrylic acid and methacrylic acid. The thermoplastic resin having acidic side groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers that are at least partially neutralized with metal ions (e.g., Zn, Na, Li), such as SURLYN® ionomers. The thermoplastic resin comprising acidic side groups can be a co-polymer of ethylene and an ethylenically unsaturated acid of either acrylic or methacrylic acid. In some example, the thermoplastic resin comprising acidic side groups is a co-polymer of ethylene and an ethylenically unsaturated acid of either acrylic or methacrylic acid, where the ethylenically unsaturated acid of either acrylic or methacrylic acid may constitute from 5 wt. % to about 25 wt. % of the co-polymer, in some examples, from 10 wt. % to about 20 wt. % of the co-polymer.

In some examples, the thermoplastic resin of the LEP printing ink comprises polyolefin co-polymers, polyethylene co-acrylic co-polymers, polyethylene co-methacrylic co-polymers, polyethylene co-vinyl acetate co-polymers, ionomers, or combinations thereof. In some examples, the thermoplastic resin of the LEP printing ink comprises or consists of alkylene acrylic or methacrylic acid resins, polyurethane resins, polyethylene imine resins, polyamide resins, polyvinyl alcohol resins, and combinations thereof.

In some examples, the thermoplastic resin may comprise ethylene or propylene acrylic acid co-polymers; ethylene or propylene methacrylic acid co-polymers; ethylene vinyl acetate co-polymers; co-polymers of ethylene or propylene (e.g., 80 wt. % to 99.9 wt. %), and alkyl (e.g., C1 to C5) ester of methacrylic or acrylic acid (e.g., 0.1 wt. % to 20 wt. %); co-polymers of ethylene (e.g., 80 wt. % to 99.9 wt. %), acrylic or methacrylic acid (e.g., 0.1 wt. % to 20.0 wt. %) and alkyl (e.g., C1 to C5) ester of methacrylic or acrylic acid (e.g., 0.1 wt. % to 20 wt. %); co-polymers of ethylene or propylene (e.g., 70 wt. % to 99.9 wt. %) and maleic anhydride (e.g., 0.1 wt. % to 30 wt. %); polyethylene; polystyrene; isotactic polypropylene (crystalline); co-polymers of ethylene ethyl acrylate; polyesters; polyvinyl toluene; polyamides; styrene/butadiene co-polymers; epoxy resins; acrylic resins (e.g., co-polymer of acrylic or methacrylic acid and at least one alkyl ester of acrylic or methacrylic acid wherein alkyl may have from 1 to about 20 carbon atoms, such as methyl methacrylate (e.g., 50 wt. % to 90 wt. %)/methacrylic acid (e.g., 0 wt. % to 20 wt. %)/ethylhexylacrylate (e.g. 10 wt. % to 50 wt. %); ethylene-acrylate terpolymers: ethylene-acrylic esters-maleic anhydride (MAH) or glycidyl methacrylate (GMA) terpolymers; ethylene-acrylic acid ionomers or combinations thereof.

The thermoplastic resin may comprise a polymer having acidic side groups. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. The acidity of a polymer in mg KOH/g can be measured by using standard procedures, for example, by using the procedure described in ASTM D1386.

The thermoplastic resin may comprise a polymer having acidic side groups that has a melt flow rate of about 70 g/10 minutes or less, in some examples, about 60 g/10 minutes or less, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the particles each individually have a melt flow rate of 90 g/10 minutes or less, in some examples, 80 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to about 40 g/10 minutes, in some examples, about 20 g/10 minutes to about 30 g/10 minutes. The polymer having acidic side groups can have a melt flow rate of, in some examples, about 50 g/10 minutes to about 120 g/10 minutes, in some examples, about 60 g/10 minutes to about 100 g/10 minutes. The melt flow rate can be measured using standard procedures, for example, as described in ASTM D1238.

The acidic side groups may be in free acid form or may be in the form of an anion and associated with a counterion, generally metal counterions, for example, a metal selected from the alkali metals, such as lithium, sodium and potassium, alkali earth metals, such as magnesium or calcium, and transition metals, such as zinc. The thermoplastic resin having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers that are at least partially neutralized with metal ions (e.g., Zn, Na, Li) such as SURLYN® ionomers. The polymer comprising acidic side groups can be a co-polymer of ethylene and an ethylenically unsaturated acid of either acrylic or methacrylic acid, in which the ethylenically unsaturated acid of either acrylic or methacrylic acid constitutes from 5 wt. % to about 25 wt. % of the co-polymer, in some examples, from 10 wt. % to about 20 wt. % of the co-polymer.

The thermoplastic resin may comprise two different polymers having acidic side groups. The two polymers having acidic side groups may have different acidities, which may fall within the ranges mentioned above. The thermoplastic resin may comprise a first polymer having acidic side groups that has an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has an acidity of 110 mg KOH/g to 130 mg KOH/g.

The thermoplastic resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples, 20 mg KOH/g to 110 mg KOH/g, in some examples, 30 mg KOH/g to 110 mg KOH/g, in some examples, 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

In some examples, the ratio of the first polymer having acidic side groups to the second polymer having acidic side groups can be from about 10:1 to about 2:1. In some examples, the ratio can be from about 6:1 to about 3:1, in some examples, about 4:1.

The thermoplastic resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The thermoplastic resin may comprise a first polymer having a melt viscosity of 15000 poise or more, in some examples, 20000 poise or more, in some examples, 50000 poise or more, in some examples, 70000 poise or more; and in some examples, the polymer resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, and in some examples, 10 poise or less. The thermoplastic resin may comprise a first polymer having a melt viscosity of more than 60000 poise, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is Nucrel 960 (from DuPont), an example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured by using a rheometer, for example, a commercially available AR-2000 Rheometer from Thermal Analysis Instruments, by using the geometry of 25 mm steel plate-standard steel parallel plate, and finding the plate over plate rheometry isotherm at 120° C., 0.01 Hz shear rate.

If the thermoplastic resin comprises a single type of polymer, the polymer (excluding any other components of the LEP printing ink) may have a melt viscosity of 6000 poise or more, in some examples, a melt viscosity of 8000 poise or more, in some examples, a melt viscosity of 10000 poise or more, in some examples, a melt viscosity of 12000 poise or more. If the thermoplastic resin comprises a plurality of polymers all of the polymers of the thermoplastic resin may together form a mixture (excluding any other components of the LEP printing ink) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured by using standard techniques. The melt viscosity can be measured by using a rheometer, for example, a commercially available AR-2000 Rheometer from Thermal Analysis Instruments, by using the geometry of 25 mm steel plate-standard steel parallel plate, and finding the plate over plate rheometry isotherm at 120° C., 0.01 Hz shear rate.

The thermoplastic resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g., Zn, Na, Li) such as SURLYN® ionomers. The thermoplastic resin may comprise (i) a first polymer that is a co-polymer of ethylene and an ethylenically unsaturated acid of either acrylic acid or methacrylic acid, wherein the ethylenically unsaturated acid of either acrylic or methacrylic acid constitutes from 8 wt. % to about 16 wt. % of the co-polymer, in some examples, 10 wt. % to 16 wt. % of the co-polymer; and (ii) a second polymer that is a co-polymer of ethylene and an ethylenically unsaturated acid of either acrylic acid or methacrylic acid, wherein the ethylenically unsaturated acid of either acrylic or methacrylic acid constitutes from 12 wt. % to about 30 wt. % of the co-polymer, in some examples, from 14 wt. % to about 20 wt. % of the co-polymer, in some examples, from 16 wt. % to about 20 wt. % of the co-polymer, and in some examples, from 17 wt. % to 19 wt. % of the co-polymer.

The thermoplastic resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, for example, ethylene or propylene. The esterified acrylic acid or esterified methacrylic acid maybe an alkyl ester of acrylic acid or an alkyl ester of methacrylic acid, respectively. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid, and (iii) a third monomer which is an alkylene monomer selected from ethylene and propylene. The first monomer may constitute 1% to 50% by weight of the co-polymer, in some examples, 5% to 40% by weight, in some examples, 5% to 20% by weight of the co-polymer, and in some examples, 5% to 15% by weight of the co-polymer. The second monomer may constitute 1% to 50% by weight of the co-polymer, in some examples, 5% to 40% by weight of the co-polymer, in some examples, 5% to 20% by weight of the co-polymer, and in some examples, 5% to 15% by weight of the co-polymer. In some examples, the first monomer constitutes 5% to 40% by weight of the co-polymer, the second monomer constitutes 5% to 40% by weight of the co-polymer, with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, with the third monomer constituting the remaining weight of the co-polymer. The polymer may be selected from the Bynel® class of polymers, including Bynel 2022 and Bynel 2002, which are available from DuPont®.

The polymer having ester side groups may constitute 1% or more by weight of the total amount of the resin polymers, for example, thermoplastic resins, in the LEP printing ink and/or the LEP printed ink image, for example, the total amount of the polymer or polymers having acidic side groups and polymer having ester side groups. The polymer having ester side groups may constitute 5% or more by weight of the total amount of the resin polymers, that is, the thermoplastic resin polymers, in some examples, 8% or more by weight of the total amount of the resin polymers, for example, thermoplastic resin polymers, in some examples, 10% or more by weight of the total amount of the resin polymers, for example, thermoplastic resin polymers, in some examples, 15% or more by weight of the total amount of the resin polymers, for example, thermoplastic resin polymers, in some examples, 20% or more by weight of the total amount of the resin polymers, for example, thermoplastic resin polymers, in some examples, 25% or more by weight of the total amount of the resin polymers, for example, thermoplastic resin polymers, in some examples, 30% or more by weight of the total amount of the resin polymers, for example, thermoplastic resin polymers, in some examples, 35% or more by weight of the total amount of the resin polymers, for example, thermoplastic resin polymers, in the LEP printing ink and/or the LEP printed ink image. The polymer having ester side groups may constitute from 5% to 50% by weight of the total amount of the resin polymers, for example, thermoplastic resin polymers, in the LEP printing ink and/or the LEP printed ink image, in some examples, 10% to 40% by weight of the total amount of the resin polymers, for example, thermoplastic resin polymers, in the LEP printing ink and/or the LEP printed ink image, in some examples, 5% to 30% by weight of the total amount of the resin polymers, for example, thermoplastic resin polymers, in the LEP printing ink and/or the LEP printed ink image, in some examples, 5% to 15% by weight of the total amount of the resin polymers, for example, thermoplastic resin polymers, in the LEP printing ink and/or the LEP printed ink image r, in some examples, 15% to 30% by weight of the total amount of the resin polymers, for example, thermoplastic resin polymers, in the LEP printing ink and/or the LEP printed ink image.

The polymer having ester side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more. The polymer having ester side groups may have an acidity of 100 mg KOH/g or less, in some examples, 90 mg KOH/g or less. The polymer having ester side groups may have an acidity of 60 mg KOH/g to 90 mg KOH/g, in some examples, 70 mg KOH/g to 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

The polymer, polymers, co-polymer, or co-polymers of the thermoplastic resin can in some examples be selected from the Nucrel family of resins (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX76™, Nucrel 2806™, Bynell 2002, Bynell 2014, Bynell 2020 and Bynell 2022 (sold by E. I. du PONT)), the AC family of resins (e.g., AC-5120, AC-5180, AC-540, AC-580 (sold by Honeywell)), the Aclyn family of resins (e.g., Aclyn 201, Aclyn 246, Aclyn 285, Aclyn 295 (sold by Honeywell)), and the Lotader family of resins (e.g., Lotader 2210, Lotader, 3430, and Lotader 8200 (sold by Arkema)).

The polymer resin can constitute about 5 to 90%, in some examples, about 50 to 80%, by weight of the solids of the LEP printing ink and/or the LEP printing ink printed on the shrink sleeve substrate. The resin can constitute about 60 to 95%, in some examples, about 70 to 95%, by weight of the solids of the LEP printing ink and/or the LEP printed ink image.

Colorant

An LEP printed ink may comprise a colorant. An LEP printing ink may comprise a colorant. The colorant may be a dye or a pigment. The colorant can be any colorant compatible with the liquid carrier and useful for electrostatic printing. For example, the colorant may be present as pigment particles or may comprise a resin (in addition to the resins described herein) and a pigment. The resins and pigments can be any of those standardly used. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. In some examples, the pigment may be a white pigment. Where the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

In some examples, the colorant (e.g. pigment) particles may have a median particle size or $d_{50}$ of 20 μm or less, for example, 15 μm or less, for example, 10 μm or less, for example, 5 μm or less, for example, 4 μm or less, for example, 3 μm or less, for example, 2 μm or less, for example, 1 μm or less, for example, 0.9 μm or less, for example, 0.8 μm or less, for example, 0.7 μm or less, for example, 0.6 μm or less, for example, 0.5 μm or less. Unless otherwise stated, the particle size of the colorant or pigment particle and the resin coated pigment particle is determined by using laser diffraction on a Malvern Mastersizer 2000 according to the standard procedure as described in the operating manual.

The colorant (e.g. pigment) particle may be present in a LEP printing ink in an amount of from 10 wt. % to 80 wt. % of the total amount of resin and pigment, in some examples, 15 wt. % to 80 wt. %, in some examples, 15 wt. % to 60 wt. %, in some examples, 15 wt. % to 50 wt. %, in some examples, 15 wt. % to 40 wt. %, in some examples, 15 wt. % to 30 wt. % of the total amount of resin and colorant. In some examples, the colorant or pigment particle may be present in a LEP printing ink in an amount of at least 50 wt. % of the total amount of resin and colorant or pigment, for example, at least 55 wt. % of the total amount of resin and colorant or pigment.

Carrier Liquid

Before and during printing of the LEP printing ink, the LEP printing ink may comprise a carrier liquid. Generally, the carrier liquid can act as a dispersing medium for the other components in the LEP printing ink. For example, the carrier liquid may comprise or be a hydrocarbon, silicone oil, vegetable oil or the like. The carrier liquid may include, but is not limited to, an insulating, non-polar, non-aqueous liquid that can be used as a medium for toner particles. The carrier liquid can include compounds that have a resistivity in excess of about $10^9$ ohm·cm. The carrier liquid may have a dielectric constant below about 5, in some examples, below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before LEP printing, the carrier liquid can constitute about 20% to 99.5% by weight of the LEP printing ink, in some examples, 60% to 99.5% by weight of the LEP printing ink. Before printing, the carrier liquid may constitute about 40% to 90% by weight of the LEP printing ink. Before printing, the carrier liquid may constitute about 60% to 80% by weight of the LEP printing ink. Before printing, the carrier liquid may constitute about 90% to 99.5% by weight of the LEP printing ink, in some examples, 95% to 99% by weight of the LEP printing ink.

The LEP printing ink, when electrostatically printed (that is, the LEP printed ink or LEP printed ink image), may be substantially free from carrier liquid. In a LEP printing process and/or afterwards, the carrier liquid may be removed, for example, by an electrophoresis process during printing and/or evaporation, such that substantially just solids are transferred to the shrink sleeve substrate. Substantially free from carrier liquid may indicate that the ink printed on the shrink sleeve substrate contains 5 wt. % or less carrier liquid, in some examples, 2 wt. % or less carrier liquid, in some examples, 1 wt. % or less carrier liquid, in some examples, 0.5 wt. % or less carrier liquid. In some examples, the electrostatically printed ink on the shrink sleeve substrate is free from carrier liquid.

Charge Director

A LEP printing ink and/or LEP printed ink may comprise a charge director. A charge director can be added to an LEP printing ink to impart a charge of a desired polarity and/or maintain sufficient electrostatic charge on the particles of an LEP printing ink. The charge director may comprise ionic compounds, including, for example, metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, and the like. The charge director may be selected from oil-soluble petroleum sulfonates (e.g., neutral Calcium Petronate™, neutral Barium Petronate™, and basic Barium Petronate™) polybutylene succinimides (e.g., OLOA™ 1200 and Amoco 575), and glyceride salts (e.g., sodium salts of phosphate mono- and diglycerides with unsaturated and saturated acid substituents), sulfonic acid salts including, for example, barium, sodium, calcium, and aluminium salts of sulfonic acid. The sulfonic acids may include, for example, alkyl sulfonic acids, aryl sulfonic acids, and sulfonic acids of alkyl succinates (e.g., see WO 2007/130069). The charge director may impart a negative charge or a positive charge on the resin-containing particles of an LEP printing ink.

The charge director may be added in order to impart and/or maintain sufficient electrostatic charge on the ink particles, which may be particles comprising the thermoplastic resin.

In some examples, the electrostatic ink composition comprises a charge director comprising a simple salt. The ions constructing the simple salts are all hydrophilic. The simple salt may include a cation selected from the group consisting of Mg, Ca, Ba, $NH_4$, tert-butyl ammonium, $Li^+$, and $Al^{+3}$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$ or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof.

In some examples, the electrostatic ink composition comprises a charge director comprising a sulfosuccinate salt of the general formula $MA_n$, wherein M is a metal, n is the valence of M, and A is an ion of the general formula (I): $[R^1—O—C(O)CH_2CH(SO_3^-)C(O)—O—R^2]$, wherein each of $R^1$ and $R^2$ is an alkyl group. In some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba.

In some examples, the charge director comprises at least one micelle forming salt and nanoparticles of a simple salt as described above. The simple salts are salts that do not form micelles by themselves, although they may form a core for micelles with a micelle forming salt. The sulfosuccinate salt of the general formula $MA_n$ is an example of a micelle forming salt. The charge director may be substantially free of an acid of the general formula HA, where A is as described above. The charge director may include micelles of said sulfosuccinate salt enclosing at least some of the nanoparticles of the simple salt. The charge director may include at least some nanoparticles of the simple salt having a size of 200 nm or less, and/or in some examples 2 nm or more.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an LEP printing ink, the charge director can constitute about 0.001% to 20% by weight, in some examples, 0.01 to 20% by weight, in some examples, 0.01 to 10% by weight, in some examples, 0.01 to 1% by weight of the solids of a LEP printing ink and/or a LEP printed ink. The charge director can constitute about 0.001 to 0.15% by weight of the solids of a LEP printing ink and/or LEP printed ink, in some examples, 0.001 to 0.02% by weight of the solids of a LEP printing ink and/or LEP printed ink. In some examples, a charge director imparts a negative charge on an LEP printing ink. The particle conductivity may range from 50 to 500 µmho/cm, in some examples, from 200-350 µmho/cm.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the LEP printing ink).

Charge Adjuvant

A LEP printing ink and/or LEP printed ink may include a charge adjuvant. A charge adjuvant may be present with a charge director, and may be different to the charge director, and act to increase and/or stabilise the charge on particles, for example, resin-containing particles of an LEP printing ink. The charge adjuvant may include barium petronate, calcium petronate, Co salts of naphthenic acid, Ca salts of naphthenic acid, Cu salts of naphthenic acid, Mn salts of naphthenic acid, Ni slats of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resonates, Co resonates, Mn resonates, Pb resonates, Zn resonates, AB diblock co-polymers of 2-ethylhexyl methacrylate-co-methacrylic acid calcium, and ammonium salts, co-polymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In some examples, the charge adjuvant is aluminium di- and/or tristearate and/or aluminium di- and/or tripalmitate.

The charge adjuvant may constitute about 0.1 to 5% by weight of the solids of a LEP printing ink and/or LEP printed ink. The charge adjuvant may constitute about 0.5 to 4% by weight of the solids of a LEP printing ink and/or LEP printed ink. The charge adjuvant may constitute about 1 to 3% by weight of the solids of a LEP printing ink and/or LEP printed ink.

Other Additives

In some examples, an LEP printing ink and/or LEP printed ink may include an additive or a plurality of additives. The additive or plurality of additives may be added at any stage of the production of the LEP printing ink. The additive or plurality of additives may be selected form a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically the wax phase separates form the resin phase upon cooling of the resin fused mixture, after the transfer of the ink film to the shrink sleeve substrate, for example, from an intermediate transfer member, which may be a heated blanket.

Primer Layer

In some examples, the printed shrink sleeve substrate comprises a shrink sleeve substrate having a primer layer disposed thereon and a LEP printed ink image disposed on the primer layer (the printed shrink sleeve substrate may comprise a primer layer disposed between the shrink sleeve substrate and the LEP printed ink image). The primer layer may be provided by coating the shrink sleeve substrate with a primer before printing the LEP printing ink on to the shrink sleeve substrate. The LEP printing ink may be electrophotographically printed to the primer layer disposed on the shrink sleeve substrate.

In some examples, the printed shrink sleeve substrate is provided by applying a primer layer to the shrink sleeve substrate, for example, to a surface of the shrink sleeve substrate, and then by applying (i.e., printing) a LEP printing ink on to the primer layer. Thus, a printed shrink sleeve substrate having disposed thereon a LEP printed ink and a primer layer disposed between the shrink sleeve substrate and the LEP printed ink image is formed.

The primer may comprise a primer resin. In some examples the primer is an aqueous primer comprising a primer resin. When it is applied, the primer resin may comprise a cross-linkable primer resin. The primer resin in the printed shrink sleeve substrate may comprise a cross-linked primer resin In a printed shrink sleeve, the primer resin may be a cross-linked primer resin. In the method of providing a printed shrink sleeve, the primer resin may be a cross-linkable primer resin, for example until after the overprint varnish composition is applied to the printed shrink sleeve substrate.

In some examples, the primer resin may be selected from the group comprising or consisting of hydroxyl containing resins, carboxylic group containing resins, amine based polymer formulations, and combinations thereof. In some examples, a hydroxyl containing resin may be selected from polyvinyl alcohol resins, for example, polyvinyl alcohol based polyvinyl butyral formulations (such as Butvar resins from Eastman), Vinnol® (from Wacker polymers), cellulose derivative additives (from Eastman), polyester resins (such as Dynapol from Evonic) and polyurethane-based formulations with hydroxyl groups. In some examples, the carboxylic group containing resins may be selected from olefin co-acrylic or methacrylic acid based copolymers, polyacrylic acid based polymers, and polylactic acid based polymers. In some examples, the copolymer is a copolymer of ethylene and an acid selected from acrylic acid or methacrylic acid, and, in some examples, acid selected from acrylic acid or methacrylic acid is present in the resin in an amount of from 10 wt % to 50 wt %, in some examples 20 to 40 wt %. In some examples, the amine based polymer formulations may be selected from polyamines and polyethylene imines (which are also known as polyaziridines). The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, and polyacrylic polymers. In some examples, the amine based polymer formulations may comprise polyethylene imines (also known as polyaziridines). In some examples, the primer may comprise a polyethylene imine in an amount of 1 to 20 wt. %, in some examples, 2 to 15 wt. %, in some examples, 3 to 10 wt. %. In some examples, the primer may comprise a polyethylene imine in an amount of up to 10 wt %.

In some examples, the primer resin comprises a carboxylic functional group, an amine functional group or a polyol functional group, or a combination thereof. In some examples, the primer resin comprises an amine functional group or a carboxylic functional group.

In some examples, the primer resin comprises an amine functional group. In some examples, the primer resin comprises or consists of a polyethylene imine resin.

The resin may have been crosslinked with a crosslinker, e.g. a cross-linker selected from melamine formaldehyde resin, phenol formaldehyde resins, polyethyleneimine and Zn and Zr complexes.

Examples of materials suitable as a primer include Michelman DigiPrime® 050 or Michelman DigiPrime® 030.

In some examples, the primer layer of the printed shrink sleeve comprises a cross-linked primer resin.

In some examples, the primer is applied or has been applied in an amount such that the coat weight of the primer on the shrink sleeve substrate is 0.01 g/m$^2$ or more, in some examples, 0.05 g/m$^2$ or more, in some examples, 0.1 g/m$^2$ or more, in some examples, in some examples, 0.14 g/m$^2$ or more, 0.15 g/m$^2$ or more, in some examples, about 0.18 g/m$^2$. In some examples, the primer is applied or has been applied in an amount such that the coat weight of the primer resin on the shrink sleeve substrate is up to about 0.2 g/m$^2$, in some examples, up to about 0.5 g/m², in some examples, up to about 1 g/m², in some examples, up to about 1.5 g/m².

Method

Described herein is a method of providing a printed shrink sleeve, the method comprising: providing a printed shrink sleeve substrate comprising a LEP printed ink image; and coating the LEP printed ink image of the printed shrink sleeve substrate with a water-based overprint varnish composition, the water-based overprint varnish composition comprising:

a varnish resin;

a crosslinking component comprising: a compound containing at least two epoxide groups; a compound containing an epoxide group and a silane group; or a compound containing at least two carbodiimide groups; and hydrophobic particles, wherein the ratio of the crosslinking component to the hydrophobic particles by weight is in the range of about 4.9:0.1 to about 1:4.

Figure 2:
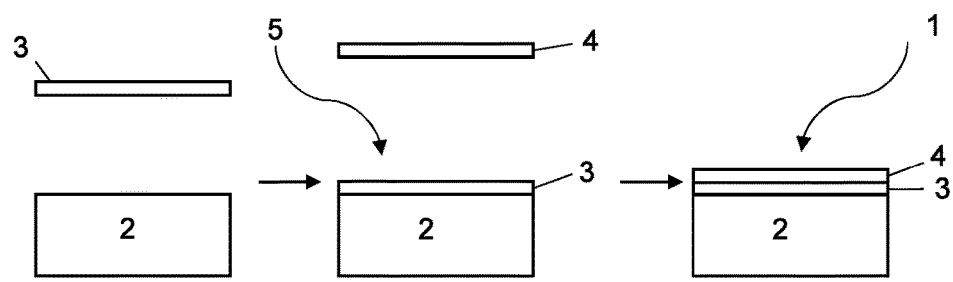
FIG. 2 is a schematic diagram of a method for providing a printed shrink sleeve.

Examples of the method described herein are depicted schematically in FIGS. 1 and 2, in which the following reference numerals are used to identify the features indicated: reference numeral "1" denotes a printed shrink sleeve; reference numeral "2" denotes a print sleeve substrate; reference numeral "3" denotes a LEP printed ink image; reference numeral "5" denotes a printed shrink sleeve substrate; reference numeral "4" denotes an overprint varnish composition (comprising the dried product of a water-based overprint varnish); reference numeral "6" denotes a primer layer.

FIG. 1 depicts a method in which a printed shrink sleeve substrate (5) having a LEP printed ink image (3) disposed thereon is provided. In some examples, the LEP printed ink image (3) comprises a LEP reverse printed image containing a coloured printed ink layer or coloured printed ink layers (e.g. yellow, magenta, cyan and black (CMYK) printed ink layers) and a white printed ink layer. In some examples the LEP printed ink image (3) comprises a white printed ink layer disposed on the coloured printed ink layers, the coloured printed ink layers being disposed on the shrink sleeve substrate (e.g. such that the white printed ink layer forms a top layer of LEP printed ink image (3) as depicted in FIG. 1. A water-based overprint varnish composition (4) is applied to the printed ink (3), wherein the water-based overprint varnish composition comprises a varnish resin; a crosslinking component comprising: a compound containing at least two epoxide groups; a compound containing an epoxide group and a silane group; or a compound containing at least two carbodiimide groups; and hydrophobic particles. In some examples, the water-based overprint varnish composition is then dried, for example by exposing to elevated temperature.

In some examples, the water-based overprint varnish composition may be applied by any suitable technique. In some examples, the water-based overprint varnish composition is applied by gravure coating, flexo coating, rod coating or screen coating. In some examples, the water-based overprint varnish composition may be applied by using a process in-line with the liquid electrostatic printing of the LEP printing ink.

In some examples, the method comprises applying a corona treatment to the surface of the printed shrink sleeve substrate (5) before applying the water-based overprint varnish composition.

In some examples, the drying and/or crosslinking of the water-based overprint varnish composition comprises exposing the printed shrink sleeve to elevated temperature.

In some examples, the drying, e.g. drying and cross-linking, of the water-based overprint varnish composition comprises exposing the printed shrink sleeve to an elevated temperature of about 50° C. or greater, for example about 60° C. or greater, or about 70° C. In some examples, the drying of the water-based overprint varnish composition comprises exposing the printed shrink sleeve to an elevated temperature in the range of about 50-70° C., for example about 60-70° C. In some examples, the drying of the water-based overprint varnish composition comprises exposing the printed shrink sleeve to elevated temperature for a time period of at least about 10 secs, for example at least about 30 mins, at least about 1 min, at least about 5 mins, or at least about 10 mins. In some examples, the drying of the water-based overprint varnish composition comprises exposing the printed shrink sleeve to elevated temperature for a time period of up to about 1 hour. In some examples, the drying of the water-based overprint varnish composition comprises exposing the printed shrink sleeve to elevated temperature for a time period in the range of about 10 secs to about 1 hour, for example about 30 secs to about 30 mins, or about 1 min to about 10 mins. In some examples, elevated temperature is provided by placing the printed shrink sleeve in a hot air oven FIG. 2 depicts a method in which a shrink sleeve substrate (2) is provided. A LEP printing ink (3) is LEP printed onto the shrink sleeve substrate (2) to form a printed shrink sleeve substrate (5) having a LEP printed ink image (3) disposed thereon. In some examples, the LEP printed ink image (3) is provided by LEP reverse printing an image containing a white printed ink layer, and coloured printed ink layer(s), for example yellow, magenta, cyan and black printed ink layers. In some examples the LEP printed ink image (3) is provided by reverse LEP printing a coloured LEP printing ink, or coloured LEP printing inks, onto the shrink sleeve substrate (2) to form a coloured printed ink layer (in some examples, the coloured printed ink layer includes multiple different coloured printed ink layers) disposed on the printed shrink sleeve (2), and reverse LEP printing the white LEP printing ink onto the coloured printed ink layer to form a white printed ink layer disposed on the coloured printed ink layer. A water-based overprint varnish composition (4) is then applied to the printed ink image (3), wherein the water-based overprint varnish composition comprises a varnish resin; a crosslinking component comprising: a compound containing at least two epoxide groups; a compound containing an epoxide group and a silane group; or a compound containing at least two carbodiimide groups; and hydrophobic particles. In some examples, the water-based overprint varnish composition is dried, for example dried and cross-linked.

In some examples, LEP printing a LEP printing ink onto the shrink sleeve substrate may comprise printing any LEP printing ink described herein by any suitable liquid electrostatic printing process. In some examples, LEP printing a LEP printing ink onto the shrink sleeve substrate may comprise LEP printing a LEP printing ink onto the shrink sleeve substrate by using a liquid electrostatic printing apparatus. Examples of suitable liquid electrostatic printing apparatus are the HP Indigo digital presses.

Figure 3:
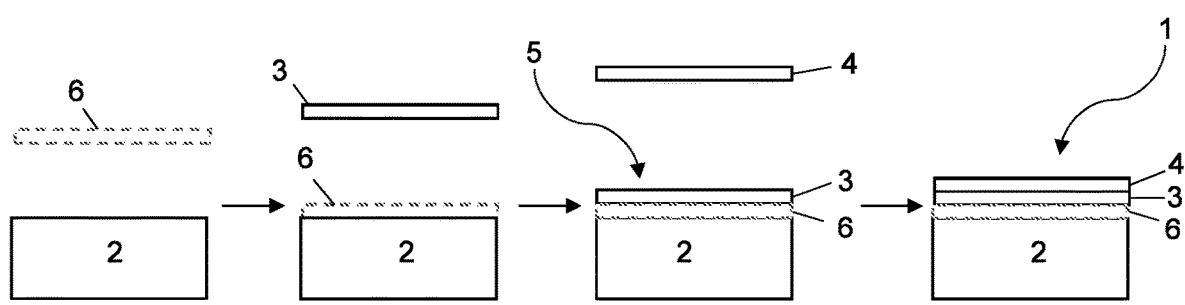
FIG. 3 is a schematic diagram of a method for providing a printed shrink sleeve.

FIG. 3 depicts a method in which a shrink sleeve substrate (2) is provided. A primer (6) is applied to the shrink sleeve substrate. A LEP printing ink (3) is then LEP printed onto the primer layer (6) on the shrink sleeve substrate (2) to form a printed shrink sleeve substrate (5) having an LEP printed ink image (3) disposed thereon. In some examples, the LEP printed ink image (3) is provided by LEP reverse printing an image containing a white printed ink layer, and coloured printed ink layer(s), for example yellow, magenta, cyan and black printed ink layers. In some examples the LEP printed ink image (3) is provided by reverse LEP printing a coloured LEP printing ink, or coloured LEP printing inks, onto the primer layer (6) of the shrink sleeve substrate (2) to form a coloured printed ink layer (in some examples, the coloured printed ink layer includes multiple different coloured printed ink layers) disposed on the primer layer (6) of the printed shrink sleeve (2), and reverse LEP printing a white LEP printing ink onto the coloured printed ink layer to form a white printed ink layer disposed on the coloured printed ink layer. A water-based overprint varnish composition (4) is then applied to the printed ink image (3), wherein the water-based overprint varnish composition comprises a varnish resin; a crosslinking component comprising: a compound containing at least two epoxide groups; a compound containing an epoxide group and a silane group; or a compound containing at least two carbodiimide groups; and hydrophobic particles. In some examples, water-based overprint varnish composition is then dried.

In some examples, the primer may be applied by any suitable technique. In some examples, the primer is applied by gravure coating, flexo coating, screen coating or electrostatic printing. In some examples, the primer may be applied by using a process in-line with the electrostatic printing of the electrostatic printing ink.

In some examples, providing a printed shrink sleeve may comprise a step of seaming the printed shrink sleeve, for example such that the printed shrink sleeve forms a cylinder shape to be placed over an item.

Also provided herein is an item having a printed shrink sleeve layer applied thereto. When formed, the overprint varnish composition (4) of the printed shrink sleeve may be in contact with the item to which the printed shrink sleeve is applied. The item may be a container, for example a bottle. The printed shrink sleeve may be placed over the item, for example a container, and shrunk around the object to for the item having a printed shrink sleeve layer applied thereto. Shrinking the printed shrink sleeve around the item may comprise heating using steam, for example exposing the printed shrink sleeve placed around the item to a temperature of greater than about 70° C., for example greater than about 80° C., greater than about 90° C., or about 95° C. or greater, in the presence of steam. Shrinking the printed shrink sleeve around the item may comprise heating using steam, for example exposing the printed shrink sleeve placed around the item to a temperature of greater than about 70° C., for example greater than about 80° C., greater than about 90° C., or about 95° C. or greater, in the presence of steam for a time of at least about 10 secs, for example about 30 secs, or for about 10 secs to 1 minute.

EXAMPLES

The following illustrates examples of the compositions and related aspects described herein. Thus, these examples should not be considered to restrict the present disclosure, but are merely in place to teach how to make examples of compositions of the present disclosure.

Example 1

A water-based overprint varnish composition was provided. 15 g of a fluoroethylene vinyl ether copolymer (FEVE Lumiflon™ 710F from AGC Chemicals) was ground (using a powder grinder and adding liquid nitrogen during grinding (i.e. cryogenic grinding)) to provide hydrophobic particles having a number average particle size of 10-20 μm (after grinding the powder was passed through a 20 micron mesh (i.e. a wire mesh having apertures with a size of 20 μm) and the particle size was measured using a microscope to measure the longest dimension of each of the particles within the field of view and the number average calculated to provide the particle size. The 15 g of hydrophobic particles was then gradually added to 60 g of glycidoxypropyl triethoxysilane (GLYMEO from Evonik™, an epoxy-silane cross-linker) under intensive mixing using a mechanical stirrer for 45 minutes at room temperature until a clear dispersion was obtained (the dispersion containing a ratio of the crosslinking component (glycidoxypropyl triethoxysilane) to the hydrophobic particles of 4:1 by weight). The dispersion containing glycidoxypropyl triethoxysilane and the dissolved hydrophobic particles was then added to 525 g of a commercially available transparent water-based overprint varnish (WDS011748 (Actdigi™ shrink sleeve aq OPV) obtained from Actega™) to provide the water-based overprint varnish composition.

Example 2

A water-based overprint varnish composition was provided according to Example 1, except that the dispersion containing glycidoxypropyl triethoxysilane and the hydrophobic particles was added to 525 g of DG215™ (a commercially available transparent water based overprint varnish obtained from Michelman™) to provide the water-based overprint varnish composition.

Example 3

A water-based overprint varnish composition was provided according to Example 1, except that the hydrophobic particles provided were hydrophobic fumed silica (15 g of Aerosil R202 from Degussa) and mixing these hydrophobic particles with the glycidoxypropyl triethoxysilane (mechanical stirring at room temperature for 15 mins) provided a slurry. As for Example 1, the slurry formed was then added to 525 g of a commercially available transparent water-based overprint varnish (WDS011748 (Actdigi™ shrink sleeve aq OPV) obtained from Actega™) to provide the water-based overprint varnish composition.

The compositions of Examples 1-3 are summarised in table 1 below.

Comparative Examples 4-10

Comparative water-based overprint varnishes were provided in a similar way to Examples 1-3 above. For some of these comparative water-based overprint varnishes no hydrophobic particles were employed, for some no crosslinking component was employed, for others only a commercially available water-based overprint varnish was used. The compositions of Comparative Examples 4-10 are summarised in table 1 below.

TABLE 1 water-based overprint varnish compositions

| Composition | Crosslinking component (A) | Hydrophobic particles (B) | Ratio A:B by weight | Other components | Amount of A + B by total weight of composition |
|---|---|---|---|---|---|
| Example 1 | glycidoxypropyl triethoxysilane | FEVE | 4:1 | Actdigi ™ | 12.5 wt. % |
| Example 2 | glycidoxypropyl triethoxysilane | FEVE | 4:1 | DG215 ™ | 12.5 wt. % |
| Example 3 | glycidoxypropyl triethoxysilane | hydrophobic fumed silica | 4:1 | Actdigi ™ | 12.5 wt. % |
| Comparative Example 4 | — | — | — | Actdigi ™ | — |
| Comparative Example 5 | glycidoxypropyl triethoxysilane | — | — | Actdigi ™ | 10 wt. % |
| Comparative Example 6 | polycarbodiimide* | — | — | Actdigi ™ | 5 wt. % |
| Comparative Example 7 | epoxy resin** | — | — | Actdigi ™ | 10 wt. % |
| Comparative Example 8 | — | — | — | DG215 ™ | — |
| Comparative Example 9 | glycidoxypropyl triethoxysilane | — | — | DG215 ™ | 10 wt. % |
| Comparative Example 10 | — | Fluoropolymer (coated solid soda lime microspheres D50 = 65-75 μm from Cospheric ™) | — | Actdigi ™ | 0.5 wt. % |

*polycarbodiimide SV-02 from Nisshinbo ™
**water soluble multifunctional epoxy resin - ERISYS ™ GE-61 from CVC Thermoset Specialties Testing Shrink sleeve substrates were primed for receiving a liquid electrophotographically printed ink image and liquid electrophotographically printed using a HP Indigo printing press 6800. Firstly a PETG (polyethylene terephalate glycol-modified) film having a thickness of 45 microns was coated with a primer (DG050 from Michelman™, a water-based primer containing polyethylene imine resin) such that the coat weight of the primer resin (polyethylene imine resin) on the substrate was about 0.1 g/m². A liquid electrophotographically reverse printed image was then disposed on the primed shrink sleeve substrate, the printed image comprising 2 separations of white ink (white HP Electroink™) and a separation of each of yellow, magenta, cyan and black ink (CMYK HP Electroink™). During the priming and printing of the shrink sleeve substrate a primer and print free edge was provided to allow for seaming of the printed shrink sleeve substrate.

The water-based overprint varnish compositions of Examples 1-3 and Comparative Examples 4-10 were then each applied to a LEP printed shrink sleeve substrate using an ABG coating system containing an Anilox roller having 200 lines/inch (78.74 lines/cm) (obtained from SANDON) at a speed of 12 m/min. The coated LEP printed shrink sleeve substrates were passed through an oven at a temperature of 70° C. at a speed of 12 m/min to dry the coated LEP printed shrink sleeves by evaporating water from the overprint varnish compositions. The coat weight of the dried water-based overprint varnish composition of each of the coated LEP printed shrink sleeve substrates was about 1 g/m².

The coated LEP printed shrink sleeves were then slitted and seamed according to standard procedure for shrink sleeves (using a slitting machine and a seaming machine). Seaming of the printed shrink sleeves was carried out using dioxolane at 80 m/min to provide the seamed printed shrink sleeves. Each of the seamed printed shrink sleeves was then placed over a 330 ml dark beer bottle and shrinking was performed in a steam oven at 95° C. for 30 sec for the full shrinkage of the seamed printed shrink sleeves on the bottle.

After being shrunk onto the bottles, each of the coated LEP printed shrink sleeves was examined visually for "wet t-shirt" appearance, cracking (including folding cracks, skiving cracks and body cracks) and for sticking of the printed shrink sleeves to the bottles. The results are shown in table 2 below.

The term "wet t-shirt", for "wet t-shirt effect", is used to describe the distorted appearance of an image due to unintended refraction of light through the sleeve due to water (for example, water not fully evaporated from the coating or water contained in the atmosphere) and/or air trapped between the shrunk printed sleeve and the container it has been shrunk around. In these tests, the sleeved bottles were observed 24 hours after shrinking had occurred as it is known that any observable "wet t-shirt" effect becomes weaker after this time.

Cracks in shrink sleeves can occur due to folding of the shrink sleeves prior to applying the shrink sleeves to a container (folding cracks), by the underlap film edge at the seaming area (skiving cracks), or in other areas of the print sleeves (i.e. not at folds or the seaming area) during application to a container (body cracks). During this testing, to imitate and enhance the pressure on the folding area of the printed shrink sleeves before application to the bottles, manual pressure on the folding area was applied using a 2 kg roll (the roll was passed 3 times over the folding area). For the imitation and enhancing of skiving defect, a plastic strip (1 inch length, 125 micron thickness) was introduced between the sleeve and container before the shrinkage. The effect of the plastic edges is similar to scratching effect of the substrate edge during shrinkage after the seaming.

The degree to which the printed shrink sleeve stuck to the bottle was visually observed after the shrunk printed shrink sleeve was peeled off the bottle, the material left behind on the bottle visually inspected to determine how badly the printed shrink sleeve stuck to the bottle.

TABLE 2

| Overprint varnish composition | Wet T-shirt | Overall cracks | Sticking to bottle |
|---|---|---|---|
| Example 1 | ◯ | + | ◯ |
| Example 2 | ◯ | + | + |
| Example 3 | ◯ | ◯ | + |
| C. Ex. 4 | X | ◯ | ◯ |
| C. Ex. 5 | X | + | ◯ |
| C. Ex. 6 | X | + | ◯ |
| C. Ex. 7 | X | + | ◯ |
| C. Ex. 8 | X | X | ◯ |
| C. Ex. 9 | X | + | ◯ |
| C. Ex. 10 | ◯ | X | + |

X-no improvement (compared to no overprint varnish applied)
◯-moderate improvement (compared to no overprint varnish applied])
+-significant improvement (compared to no overprint varnish applied)

The present inventors have found that the water-based overprint varnish compositions described herein provide improvements in LEP printed shrink sleeves by providing improvements in cracking, container sticking and wet t-shirt performance. Without wishing to be bound by theory, it is thought that the cross-linking components described herein cross-link resin/polymer components in each of the overprint varnish layer, the ink layer and the primer layer as well as forming networks between these layers (for example, spectroscopy results confirmed presence of a cross-linking component in the primer layer). The present inventors have surprisingly found that the combinations of cross-linking components and hydrophobic particles described herein can be advantageously employed to provide water-based overprint varnish compositions that can be effectively applied to LEP printed shrink sleeves and also provide the benefits described above.

The present inventors have found particular advantages in providing a water-based overprint varnish composition comprising a cross-linking component comprising a compound containing an epoxide group and a silane group in combination with hydrophobic particles made from fluoropolymers (fluoroethylene vinyl ether copolymers particularly).

While the compositions, methods and related aspects have been described with reference to certain examples, it will be appreciated that various modifications, changes, omissions, and substitutions can be made without departing from the spirit of the disclosure. It is intended, therefore, that the compositions, methods and related aspects be limited only by the scope of the following claims. Unless otherwise stated, the features of any dependent claim can be combined with the features of any of the other dependent claims, and any other independent claim.

The invention claimed is:

1. A method of providing a printed shrink sleeve, the method comprising:
   providing a printed shrink sleeve substrate comprising a liquid electrophotographically printed ink image; and
   coating the liquid electrophotographically printed ink image of the printed shrink sleeve substrate with a water-based overprint varnish composition, the water-based overprint varnish composition comprising:
   a varnish resin;
   a crosslinking component comprising: a compound containing at least two epoxide groups; a compound containing an epoxide group and a silane group; or a compound containing at least two carbodiimide groups; and
   hydrophobic particles,
   wherein the ratio of the crosslinking component to the hydrophobic particles by weight is in the range of about 4.9:0.1 to about 1:4.

2. A method according to claim 1, wherein the printed shrink sleeve substrate comprises a primer layer disposed between the shrink sleeve substrate and liquid electrophotographically printed ink image.

3. A method according to claim 1, wherein the ratio of the crosslinking component to the hydrophobic particles by weight is in the range of about 4.5:0.5 to about 3:2.

4. A method according to claim 1, wherein the water-based overprint varnish resin comprises the cross-linking component and the hydrophobic particles in an amount such that the total amount of the cross-linking component and the hydrophobic particles together in the composition is at least about 5 wt. % by total weight of the composition, and optionally up to about 20 wt. % by total weight of the composition.

5. A method according to claim 1 comprising preparing the water-based overprint varnish composition comprising: mixing the crosslinking component and the hydrophobic particles to form a slurry.

6. A method according to claim 1, wherein the crosslinking component comprises a compound containing an epoxide group and a silane group, the compound having the formula (I):

$$(XR^1\text{—})_n Si(R^2)_{4-n} \quad (I)$$

wherein
X is glycidyloxy, epoxy, or epoxycycloalkyl;
$R^1$ is a hydrocarbon linker group;
each $R^2$ is independently selected from $OR^3$, wherein $R^3$ is selected from hydrogen, substituted or unsubstituted alkyl, substituted or unsubstituted carboxyl, substituted or unsubstituted alkenyl, substituted or unsubstituted alkynyl and substituted or unsubstituted aryl; and
n is 1, 2 or 3, in some examples n is 1.

7. A method according to claim 1, wherein the crosslinking component comprises a compound containing at least two carbodiimide groups, the compound having a carbodiimide equivalent weight in the range of about 300 to about 440.

8. A method according to claim 1, wherein the crosslinking component comprises a compound containing at least two epoxide groups, the compound having the following formula (III):

$$(X)\text{—}(Y[Z\text{—}F]_p)_q \quad (III)$$

wherein,
in each $(Y\text{—}[Z\text{—}F]_p)$, Y, Z and F are each independently selected, such that
F is an epoxy group, of the formula —CH(O)CR$^6$H, wherein $R^6$ is selected from H and alkyl;
Z is alkylene,
Y is selected from (i) a single bond, —O—, —C(=O)—O—, —O—C(=O)— wherein p is 1 or (ii) Y is NH$_{2\text{-}p}$ wherein p is 1 or 2,
q is at least 1,
and X is an organic group.

9. A method according to claim 1, wherein the overprint varnish composition comprises the cross-linking component in an amount in the range of about 2 wt. % to about 20 wt. % by total weight of the composition, and the hydrophobic particles in an amount in the range of about 0.3 wt. % to about 5 wt. % by total weight of the composition.

10. A method according to claim 1, wherein the hydrophobic particles comprise inorganic particles coated with a hydrophobic coating or particles of a hydrophobic polymer.

11. A method according to claim 1, wherein the crosslinking component comprises a compound containing an epoxide group and a silane group, the compound having the formula (I):

$$(XR^1-)_n Si(R^2)_{4-n} \qquad (I)$$

wherein

X is glycidyloxy, epoxy, or epoxycycloalkyl;

$R^1$ is a hydrocarbon linker group;

each $R^2$ is independently selected from $OR^3$, wherein $R^3$ is selected from hydrogen, substituted or unsubstituted alkyl, substituted or unsubstituted carboxyl, substituted or unsubstituted alkenyl, substituted or unsubstituted alkynyl and substituted or unsubstituted aryl; and n is 1, 2 or 3; and wherein the hydrophobic particles are particles of a fluoropolymer.

12. A method according to claim 1, wherein the compound containing at least two epoxide groups, the compound containing an epoxide group and a silane group, and the compound containing at least two carbodiimide groups each have a molecular weight Mw of less than about 400.

13. A method according to claim 1, wherein providing a printed shrink sleeve substrate comprising a liquid electrophotographically printed ink image comprises liquid electrophotographically printing a liquid electrophotographic printing ink to the printed shrink sleeve substrate, the liquid electrophotographic printing ink comprising:

a carrier liquid;

a thermoplastic resin comprising a polymer having acid side groups; and a colourant.

14. A liquid electrophotographically printed shrink sleeve comprising:

a shrink sleeve substrate;

a liquid electrophotographically printed ink image disposed on the shrink sleeve substrate; and an overprint varnish composition disposed on the liquid electrophotographically printed ink image, wherein the overprint varnish composition comprises the dried and crosslinked product of a water-based overprint varnish composition comprising:

a varnish resin;

a crosslinking component comprising: a compound containing at least two epoxide groups; a compound containing an epoxide group and a silane group; or a compound containing at least two carbodiimide groups; and hydrophobic particles, wherein the ratio of the crosslinking component to the hydrophobic particles by weight is in the range of about 4.9:0.1 to about 1:4.

15. A water-based overprint varnish composition comprising:

a varnish resin;

a crosslinking component comprising: a compound containing at least two epoxide groups; a compound containing an epoxide group and a silane group; or a compound containing at least two carbodiimide groups; and hydrophobic particles, wherein the ratio of the crosslinking component to the hydrophobic particles by weight is in the range of about 4.9:0.1 to about 1:4.

* * * * *